(12) United States Patent
Lehman

(10) Patent No.: US 6,189,338 B1
(45) Date of Patent: Feb. 20, 2001

(54) BRAZED-PLATES CONDENSER AND ITS APPLICATION TO DOUBLE AIR-DISTILLATION COLUMNS

(75) Inventor: Jean-Yves Lehman, Maisons-Alfort (FR)

(73) Assignee: L'Air Liquide, Societe Anonyme pour l'Etude et l'Exploitation des Procedes Georges Claude, Paris (FR)

(*) Notice: Under 35 U.S.C. 154(b), the term of this patent shall be extended for 0 days.

(21) Appl. No.: 09/245,873

(22) Filed: Feb. 8, 1999

(30) Foreign Application Priority Data

Feb. 9, 1998 (FR) .................................... 98 01500

(51) Int. Cl.[7] ................................. F25J 3/00; F25J 5/00; F28B 9/10; F28B 3/00
(52) U.S. Cl. .............................. 62/643; 62/903; 165/111; 165/114
(58) Field of Search ...................... 62/643, 903; 165/111, 165/114, 166

(56) References Cited

U.S. PATENT DOCUMENTS

| | | | |
|---|---|---|---|
| 3,992,168 | * 11/1976 | Toyama et al. ................... | 62/903 |
| 4,330,308 | * 5/1982 | Grenier et al. ................... | 165/140 |
| 4,599,097 | * 7/1986 | Petit et al. ................... | 62/903 |
| 5,709,264 | * 1/1998 | Sweeney et al. ................... | 165/115 |
| 5,765,631 | * 6/1998 | Gerard ................... | 165/166 |

FOREIGN PATENT DOCUMENTS

| | | |
|---|---|---|
| 0 019 508 | 11/1980 | (EP) . |
| 0 130 122 | 1/1985 | (EP) . |
| 63-187085 | 8/1988 | (JP) . |

* cited by examiner

*Primary Examiner*—William Doerrler
(74) *Attorney, Agent, or Firm*—Young & Thompson

(57) ABSTRACT

In this condenser in which the fluid as it condenses flows downward, in cross section, that part of the outlet box (18) which lies between its lowermost point (28) and the point (31) of a liquid-outlet pipe (30; 35) connected to this box, lies completely at a level that is lower than the level of the lowermost point (A) of the distributor corrugation (13).

Application to the main vaporizer-condensers of double air-distillation columns.

23 Claims, 4 Drawing Sheets

BRAZED-PLATES CONDENSER AND ITS APPLICATION TO DOUBLE AIR-DISTILLATION COLUMNS

The present invention relates to a brazed-plates condenser, of the type comprising an exchanger body which has at least one condensation passage which is flat in shape and delimited between two substantially vertical parallel plates, this passage containing, over most of its height, a heat-exchange spacer corrugation with substantially vertical generatrices; an inlet box for a gas that is to be condensed, this box being located at the upper end of the passage; an outlet box for the liquid condensate, this box being located at the bottom end of the passage; a distributor spacer corrugation, the generatrices of which are at an angle to the direction of the generatrices of the heat corrugation and which direct the liquid condensate from the bottom end of the heat-exchange corrugation to the outlet box.

The invention applies, for example, to the main vaporizer-condensers of double air-distillation columns.

Brazed-plates cryogenic condensers are in widespread use. In general, they condense a first fluid flowing downward through the exchanger body by the vaporization of a second fluid flowing through passages adjacent to the condensation passages.

In certain applications, the gas being condensed contains a small proportion of constituents which have a low boiling point and are known as "uncondensables", that cannot be condensed at the temperature of the exchange. In the case of the main vaporizer-condensers of double distillation columns, the fluid condensed is nitrogen, and the uncondensables are hydrogen, helium and neon.

When the gas that is to be condensed flows downward through the exchanger body, the uncondensables are carried toward the bottom by the speed at which the liquid formed flows and are then deflected by the distributor corrugation toward the outlet box. The latter generally comprises, at the bottom, a liquid discharge nozzle which opens into a liquid reservoir, and at the top generally comprises a nozzle for discharging the gas phase containing the uncondensables at a predetermined rate.

However, in practice, complete discharge of the uncondensables is difficult to achieve because, in the bottom of the condensate passages, the lower region of the distributor corrugation which opens into the heat-exchange zone furthest from the outlet box, is sometimes flooded with liquid. Gas, containing the uncondensables, therefore stagnates in this zone, and this reduces the efficiency of the condenser and disturbs the equilibrium of the heat transfers. This is because the zones in which the uncondensables accumulate participate less in vaporizing the liquid causing heat exchange to be concentrated into the other parts of the condenser.

The object of the invention is to supply a brazed-plates condenser in which the discharge of the uncondensables is encouraged.

To this end, the subject of the invention is a brazed-plates condenser of the aforementioned type, characterized in that, in cross section, that part of the outlet box which lies between its lowermost point and the point of a liquid-outlet pipe connected to this box, lies completely at a level that is lower than the level of the lowermost point of the distributor corrugation.

The condenser according to the invention may have one or more of the following features, taken separately or in any technically feasible combination thereof:

- the distributor corrugation has generatrices which are inclined downward from the lower end of the heat-exchange corrugation to the outlet box;
- the outlet box is located completely beside the body of the exchanger, and the plates are extended downward as far as the lowermost point of the outlet box;
- in a lower region of the passage remote from the outlet box, the passage contains a stiffening spacer corrugation which possibly has a construction and/or corrugation spacing and/or an orientation that differs from the corresponding characteristics of the distributor corrugation;
- the spacer corrugation and the distributor corrugation are made from one and the same corrugated sheet;
- the outlet box straddles a lower edge of the heat-exchanger body and is connected to this body along an upper longitudinal line running along a lateral face of the body and along a lower longitudinal line running along the underside of said body;
- the outlet box is connected to the exchanger body along an upper longitudinal line running along a lateral face of the body and along a lower longitudinal line which runs along the same lateral face or along the corresponding lower edge of said body;
- the outlet box is connected to the exchanger body along two longitudinal lines running along the underside of this body, one of these lines possibly following a lower edge of the body;
- the outlet box is equipped with a liquid-discharge duct which starts from near its lowermost point and with a gas-discharge duct which starts from near its uppermost point;
- the outlet box is equipped with fluid-discharge pipework, the axis of which passes outside the overall axis of the outlet box with respect to the body;
- said pipework has an essentially vertical axis (X—X); and
- said pipework is extended upward beyond the outlet box, to form a gas-discharge duct.

The following are also subjects of the invention:

- a vaporizer-condenser for a double air-distillation column, intended to vaporize oxygen by the condensing of nitrogen, characterized in that the condenser part of this vaporizer-condenser is as defined hereinabove;
- a double air-distillation column, characterized in that it comprises a vaporizer-condenser so defined; and
- a method of condensing a fluid in a brazed-plates condenser, of the type comprising an exchanger body which has at least one condensation passage which is flat in shape and delimited between two substantially vertical parallel plates, this passage containing, over most of its height, a heat-exchange spacer corrugation with substantially vertical generatrices; an inlet box for a gas that is to be condensed, this box being located at the upper end of the passage; an outlet box for the liquid condensate, this box being located at the bottom end of the passage; a distributor spacer corrugation, the generatrices of which are at an angle to the direction of the generatrices of the heat corrugation and which direct the liquid condensate from the bottom end of the heat-exchange corrugation to the outlet box, characterized in that the free surface of the liquid is permanently kept at a level below that of the lowermost point of the distributor corrugation.

Illustrative embodiments of the invention will now be described with reference to the appended drawings, in which:

FIG. 1 diagrammatically depicts a double distillation column in accordance with the invention;

Figure 1:
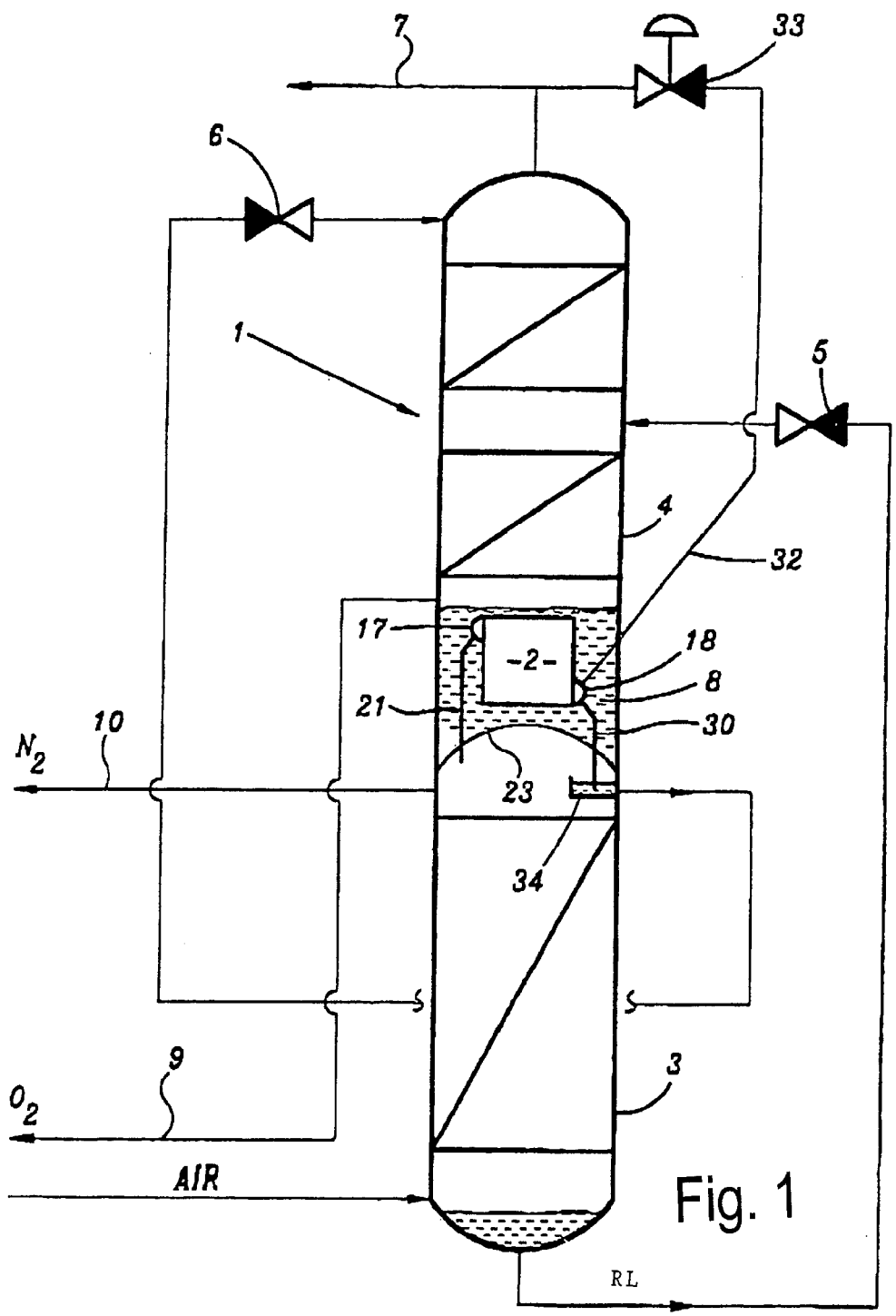

The double column 1 depicted in FIG. 1 has a conventional structure with the exception of its main vaporizer-condenser: it comprises a medium-pressure column 3 on top of which a low-pressure column 4 sits. The air that is to be distilled is introduced at a medium pressure of 5 to 6 bar absolute at the bottom of column 3. "Rich Liquid" (air enriched with oxygen) drawn off from the base of this column has its pressure reduced to a low pressure of the order of 1.2 bar absolute in a pressure-reducing valve 5 and is introduced at an intermediate level of the column 4. "Lean Liquid" (practically pure nitrogen) is drawn off from the top of the column 3 and, after having its pressure reduced in a pressure-reducing valve 6, is introduced into the top of the column 3.

The column 3 produces at its top a residual gas (impure nitrogen) which is discharged via a duct 7, and at its bottom a pool of liquid oxygen 8 forms. Gaseous production oxygen is drawn off from above the pool 8 via a duct 9, and nitrogen gas at the medium pressure is drawn off from the top of the column 3 via a duct 10.

Figure 2:
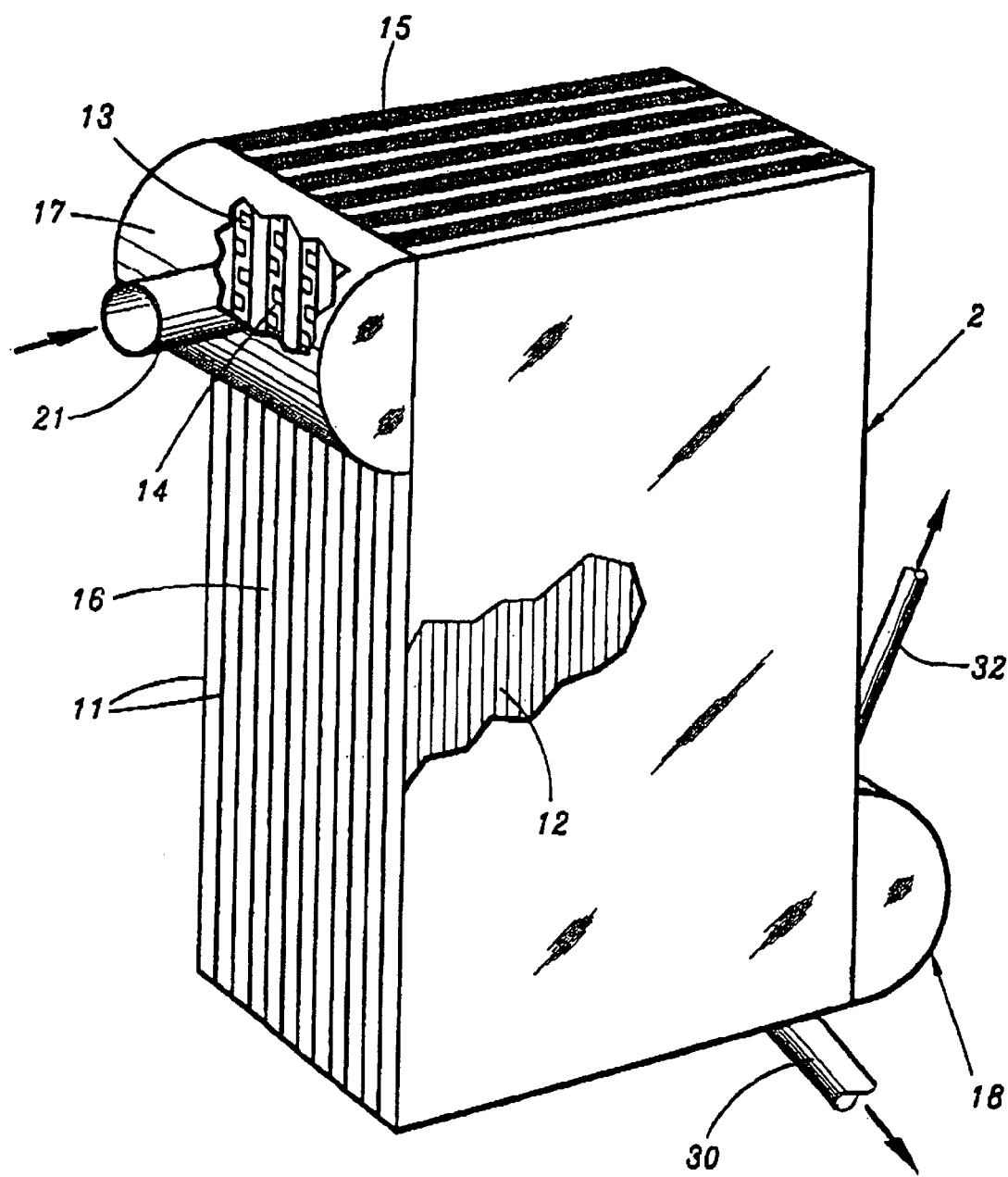
FIG. 2 depicts in perspective, with cutaway, the vaporizer-condenser of this double column.

The vaporizer-condenser 2, of the brazed-plates type, condenses medium-pressure nitrogen by the vaporizing of low-pressure liquid oxygen. As depicted in FIG. 2, it comprises an exchanger body of parallelepipedal overall shape, consisting of a stack of vertical and parallel rectangular plates 11 separated by heat-exchange spacer corrugations 12 and by distributor corrugations 13. These plates delimit between them a great many passages which are flat in shape, and which are, alternately, passages 14 for the condensing of nitrogen and passages 15 for the vaporizing of oxygen.

The passages 15 are closed at the sides along their entire height by spacer strips 16 and are open at the top and at the bottom. The passages 14 are closed around their entire periphery by spacer strips 16, except at two places: at the top on one side of the exchanger body (to the left in FIG. 2), and at the bottom on the other side of this body. The strips 16 have been omitted from FIGS. 3 to 6 with a view to making the drawings simpler.

At these two places there are thus defined an upper horizontal row of openings for nitrogen gas to enter, and a lower horizontal row of openings for liquid nitrogen to exit. The first row is capped by an inlet box 17 for nitrogen gas, and the other row by an outlet box 18 for liquid nitrogen. Each of these boxes is made of three sheets welded together: a main semi-cylindrical sheet 19 of horizontal axis, which extends over the entire thickness of the exchanger body, and two end plates in the form of quarters of a cylinder with vertical axes, as is well known in the art.

As depicted in FIG. 1, the vaporizer-condenser 2 is immersed in the pool of liquid oxygen 8, at the bottom of the column 4. The boxes 17 and 18 communicate with the space at the top of the column 3 by means of respective ducts 21 and 22 which pass in leaktight manner through the upper dome 23 of this column 3.

Figure 3:
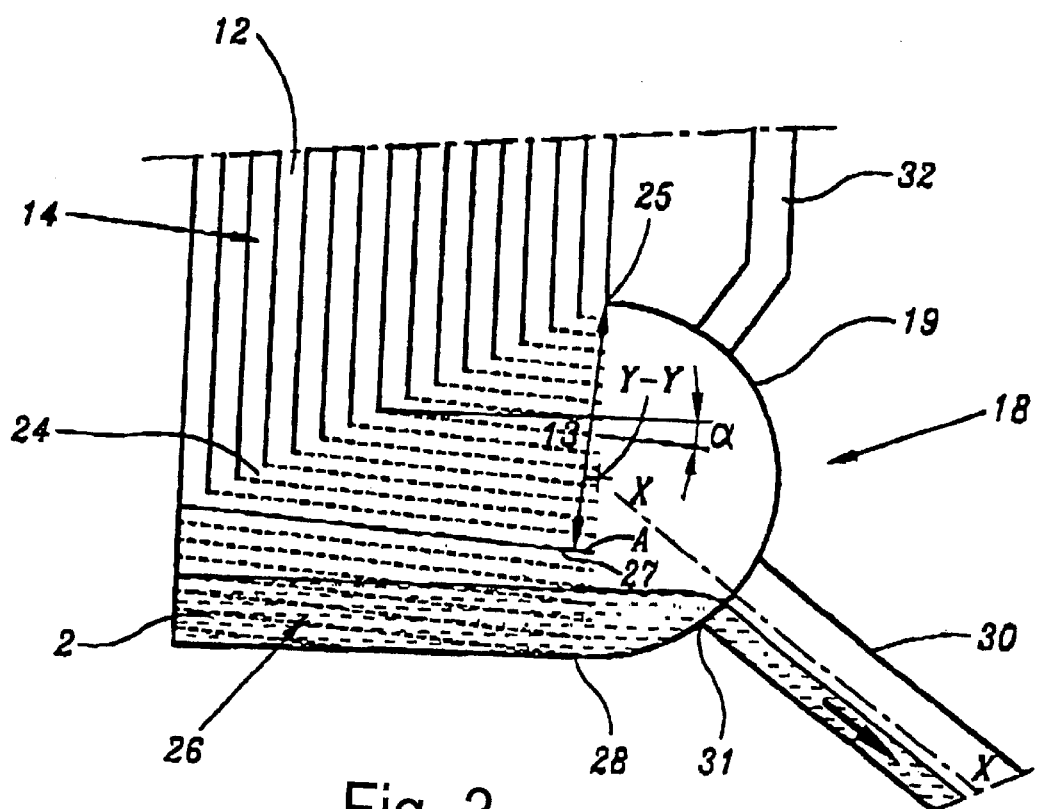
FIG. 3 is a diagrammatic sectioned view of the lower part of the vaporizer-condenser, the section being taken along a nitrogen condensation passage.

The construction of the lower part of each condensation passage 14 will now be described with reference to FIG. 3.

Over most of its height, the passage 14 contains a heat-exchange corrugation 12 which has vertical generatrices and is perforated. This corrugation ends in an oblique line 24 which extends up as far as the upper level of the box 18. At this level, the upper generatrix 25 of the sheet 19 is welded along the adjacent lateral face of the exchanger body.

The remaining lower space of the passage 14 contains a corrugation 26, which may or may not be perforated, and the generatrices of which descend at a modest positive angle α, for example of the order of 10 to 20°, toward the box 18. From the line 25 to the generatrix 27 of the corrugation which meets the lowermost point of the line 24, this corrugation is a distributor outlet corrugation 13 which routes toward the box 18 the two-phase fluid that reaches the bottom of the corrugation 12, across the entire width of the passage 14.

The sheet 19 extends downward as far as a level that is below the lowermost point A of the generatrix 27, that is to say the corrugation 13. Its lower generatrix 28 is welded all along the adjacent lower horizontal edge of the exchanger body.

Thus, the box 18 is able to withstand the medium pressure of the nitrogen, and that part of the corrugation 26 that lies below the generatrix 27 forms a "dead" spacer corrugation 29 of trapezoidal shape which simply acts as a spacer piece and keeps the plates flat and vertical despite the pressure of the nitrogen.

Incidentally, a nozzle 30, the axis X—X of which meets the axis Y—Y of the sheet 19, departs obliquely downward from the box 18. The lowermost point 31 of the circle of intersection between this nozzle and the sheet 19 is slightly above the generatrix 28. Another nozzle 32 leaves upward from near the uppermost point of the sheet 19, and meets the pipe 7 via a pressure-reducing valve 33 (FIG. 1).

In service, the uncondensables, being light gases, separate from the oxygen at the same time as the nitrogen in the medium-pressure column 3. In the vaporizer-condenser 2, the corrugation 13 guides the two-phase fluid consisting of liquid nitrogen, nitrogen gas and uncondensables toward the box 18, and the liquid collects in the lower part of this box and is removed via the duct 30. The level of the liquid becomes established slightly above the point 31, and there is no circulation of gas through the nozzle 30 because of the reservoir of liquid 34 that there is at the lower end of the nozzle (FIG. 1). Because of the presence of the corrugation 29, this liquid level lies below the lowermost point A of the generatrix 27.

In consequence, the distributor corrugation 13 is never flooded, even partially, which means that no obstacle to the flow of the two-phase fluid is created. This allows effective discharge of the uncondensables, with a predetermined flow of nitrogen, through the nozzle 32.

Figure 4:
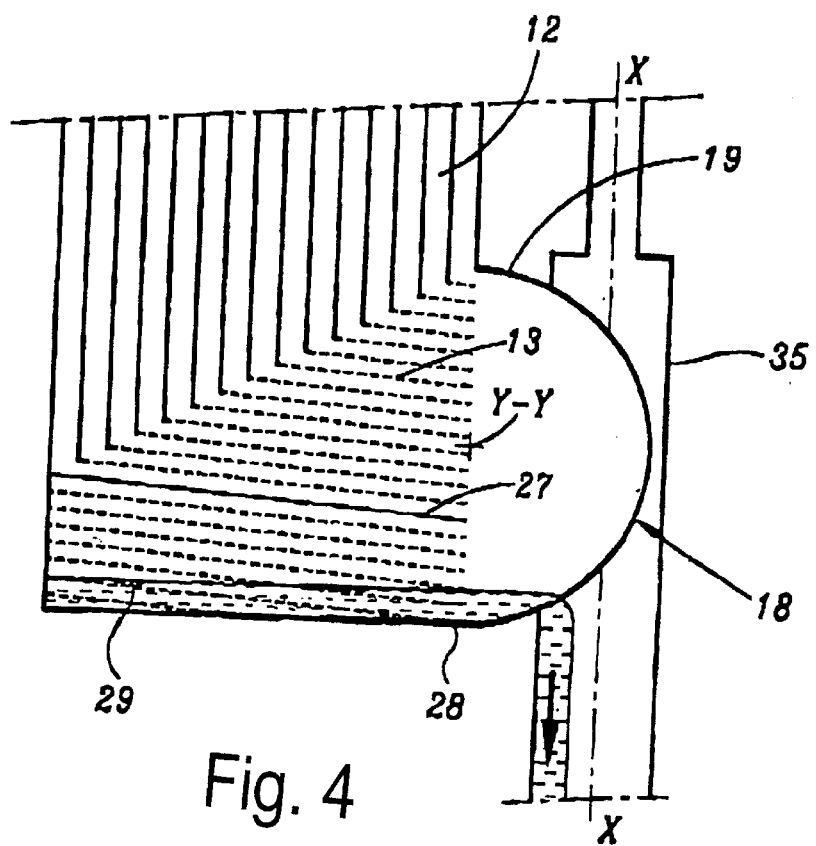
FIGS. 4 to 6 are similar views of other embodiments.

The alternative form in FIG. 4 differs from the previous one only in the way in which the fluids are discharged from the box 18. Specifically, the nozzles 30 and 32 are replaced by a single nozzle 35, the axis X—X of which is offset, with respect to the axis Y—Y, in the opposite direction to the exchanger body, while the angle of inclination of this axis X—X is increased as far as being vertical in the example depicted.

This makes it possible to increase the area of intersection of the nozzle 35 and of the sheet 19, and therefore to increase the flow rate of liquid removed, thus lowering the level of the liquid in the exchanger body. The absence of liquid in the distributor corrugation 13 is thus obtained more easily, even with an outlet box of small size.

Figure 5:
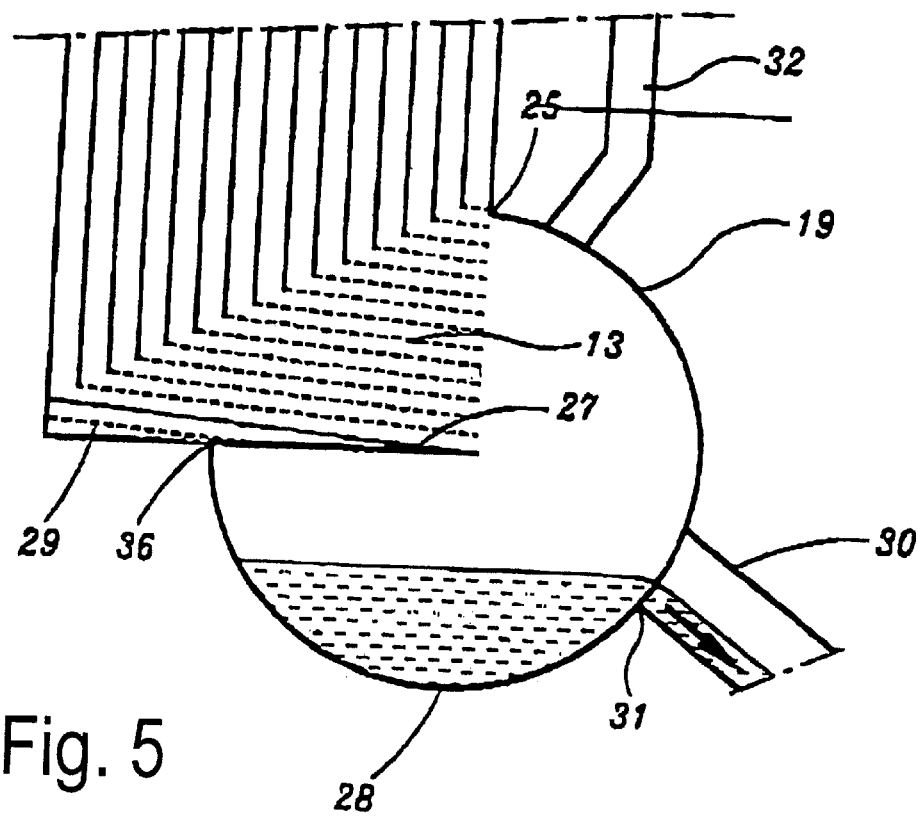

In the embodiment of FIG. 5, the generatrix 27 meets the lower horizontal edge of the exchanger body, which means that the dead corrugation 29 is triangular in shape. The sheet 19 extends, from its upper generatrix 25, over three quarters of a cylinder, straddling said edge of the exchanger body, and its opposite generatrix 36 is welded to the underside of the exchanger body. In this configuration, the box may be closed at each end by a sheet in the form of half of an ellipsoid of revolution welded to the end edge of the sheet 18 and, over a quarter of a circle, to the corresponding end plate 11.

Figure 6:
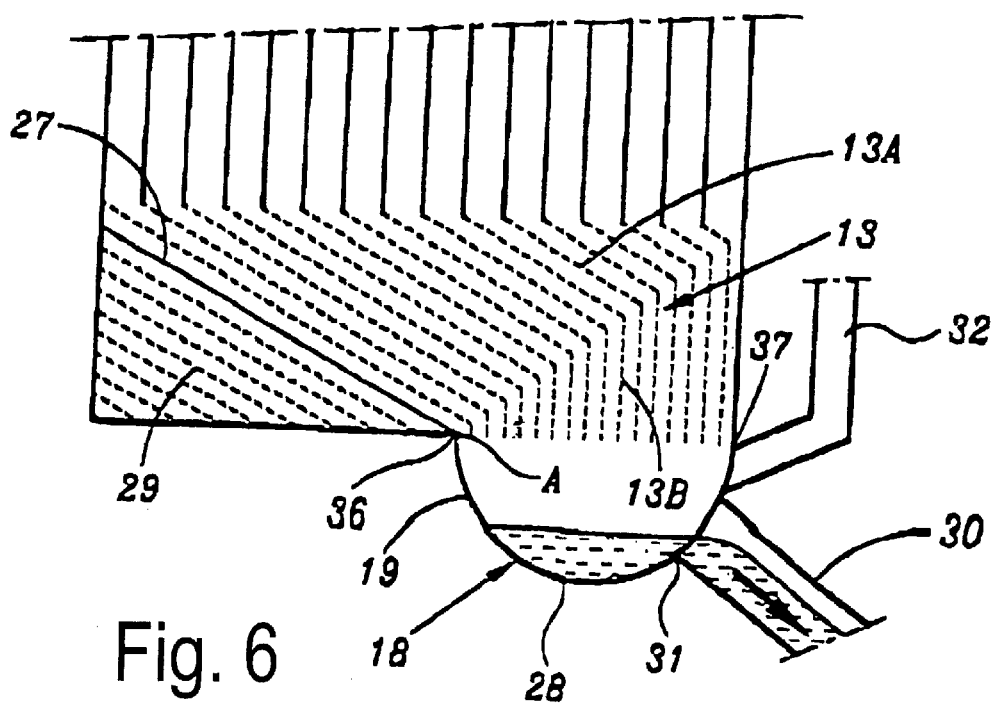

In the embodiment of FIG. 6, the outlet box 18, of semi-cylindrical overall shape, lies completely under the exchanger body, with one end generatrix 36 welded to the underside of the body, as before, and its other end generatrix 37 welded along a lower edge of the body. The outlet openings for liquid nitrogen and for gas form a row along this lower edge, and are adjacent to the generatrix 37. The corrugation 13 comprises a first upper oblique corrugation 13A of triangular shape, with it slower generatrix 27 meeting the generatrix 36 at the lowermost point A, and a second lower distributor corrugation 13B with vertical generatrices, also of triangular shape, opening into the box 18. Here, too, there is also the dead corrugation 29, of triangular shape.

Once again, this embodiment makes it possible to keep the liquid in the box 18 at a level below the distributor corrugation 13 using an outlet box of small size.

The invention has been described hereinabove in its application to a vaporizer-condenser of the pool type, in which the passages for the refrigerant (oxygen) are open top and bottom, so as to crate an upward convective movement of this fluid. However, the invention also applies to any other kind of condenser, particularly to vaporizer-condensers of the wetting film type, such as those described, for example, in EP-A-0,130,122.

In each embodiment, the "dead" corrugation 29 may be produced independently of the distributor corrugation 13, with any corrugation spacing and any orientation.

What is claimed is:

1. Brazed-plates condenser, the condenser comprising a heat exchanger body which has at least one condensation passage for a condensing fluid flowing downward and containing low boiling constituents, said condensation passage being flat in shape and delimited between two substantially vertical parallel plates, said passage having a general plane, said passage containing, over most of its height, a heat-exchange spacer corrugation with substantially vertical generatrices; an inlet box for said fluid, said inlet box being located at the upper end of the passage; an outlet box for a liquid resulting from said condensation of said fluid except said low-boiling constituents, said outlet box being located at the bottom end of the passage and at a bottom end of the plates, said outlet box being connected to a liquid condensate outlet pipe and to a gas outlet pipe; an outlet distributor spacer corrugation having generatrices which are at an angle to the direction of the generatrices of the heat-exchange corrugation and which direct the liquid condensate from a bottom end of the heat-exchange corrugation to the outlet box, wherein, in cross section in said general plane, a part of the outlet box which leis between a lowermost point of said outlet box and a lowermost point of intersection of said liquid condensate outlet pipe and said outlet box, is entirely situated at a level that is lower than the level of a lowermost point of the distributor corrugation.

2. Condenser according to claim 1, characterized in that the distributor corrugation (13) has generatrices which are inclined downward from the lower end of the heat-exchange corrugation (12) to the outlet box (18).

3. Condenser according to claim 1, characterized in that the outlet box (18) is located completely beside the body of the exchanger, and in that the plates (11) are extended downward as far as the lowermost point (28) of the outlet box (18).

4. Brazed-plates condenser, of the type comprising an exchanger body which has at least one condensation passage (14) which is flat in shape and delimited between two substantially vertical parallel plates (11), this passage containing, over most of its height, a heat-exchange spacer corrugation (12) with substantially vertical generatrices; an inlet box (17) for a gas that is to be condensed, this box being located at the upper end of the passage; an outlet box (18) for the liquid condensate, this box being located at the bottom end of the passage; a distributor spacer corrugation (13), the generatrices of which are at an angle to the direction of the generatrices of the heat corrugation and which direct the liquid condensate from the bottom end of the heat-exchange corrugation (12) to the outlet box (18), characterized in that, in cross section, that part of the outlet box (18) which leis between its lowermost point (28) and the point (31) of a liquid-outlet pipe (30; 35) connected to this box, lies completely at a level that is lower than the level of the lowermost point (A) of the distributor corrugation (13);

wherein the outlet box (18) is located completely beside the body of the exchange, and in that the plates (11) are extended downward as far as the lowermost point (28) of the outlet box (18); and wherein in a lower region of the passage (14) remote from the outlet box (18), the passage contains a stiffening spacer corrugation (28).

5. Condenser according to claim 4, characterized in that the spacer corrugation (28) and the distributor corrugation (13) are made from one and the same corrugated sheet.

6. Condenser according to claim 1, characterized in that the outlet box (18) straddles a lower edge of the heat-exchanger body and is connected to this body along an upper longitudinal line (25) running along a lateral face of the body and along a lower longitudinal line (36) running along the underside of said body.

7. Condenser according to claim 1, characterized in that the outlet box (18) is connected to the exchanger body along an upper longitudinal line (25) running along a lateral face of the body and along a lower longitudinal line (28) which runs along the same lateral face or along the corresponding lower edge of said body.

8. Condenser according to claim 1, characterized in that the outlet box (18) is connected to the exchanger body along two longitudinal lines (36, 37) running along the underside of this body, one of these lines possibly following a lower edge of the body.

9. Condenser according to claim 1, characterized in that the outlet box (18) is equipped with a liquid-discharge duct (29) which starts from near its lowermost point and with a gas-discharge duct (31) which starts from near its uppermost point.

10. Brazed-plates condenser, of the type comprising an exchanger body which has at least one condensation passage (14) which is flat in shape and delimited between two substantially vertical parallel plates (11), this passage containing, over most of its height, a heat-exchange spacer corrugation (12) with substantially vertical generatrices; an inlet box (17) for a gas that is to be condensed, this box being located at the upper end of the passage; an outlet box (18) for the liquid condensate, this box being located at the bottom end of the passage; a distributor spacer corrugation (13), the generatrices of which are at an angle to the direction of the generatrices of the heat corrugation and which direct the liquid condensate from the bottom end of the heat-exchange corrugation (12) to the outlet box (18), characterized in that, in cross section, that part of the outlet box (18) which leis between its lowermost point (28) and the point (31) of a liquid-outlet pipe (30; 35) connected to this box, lies completely at a level that is lower than the level of the lowermost point (A) of the distributor corrugation (13);

wherein the outlet box (18) is equipped with fluid-discharge pipework (35), the axis (X—X) of which passes outside the overall axis (Y—Y) of the outlet box with respect to the body.

11. Condenser according to claim 10, characterized in that said pipework (35) has a substantially vertical axis (X—X).

12. Condenser according to claim 11, characterized in that said pipework (35) is extended upward beyond the outlet box (18), to form a gas-discharge duct.

13. Brazed-plates condenser, the condenser comprising a heat exchanger body which has at least one condensation passage for a condensing fluid flowing downward and containing low boiling constituents, said condensation passage being flat in shape and delimited between two substantially vertical parallel plates, said passage having a general plane, said passage containing, over most of its height, a heat-exchange spacer corrugation with substantially vertical generatrices; an inlet box for said fluid, said inlet box being located at the upper end of the passage; an outlet box for a liquid resulting from said condensation of said fluid except said low-boiling constituents, said outlet box being located at the bottom end of the passage and at a bottom end of the plates, said outlet box being connected to a liquid condensate outlet pipe and to a gas outlet pipe; an outlet distributor spacer corrugation having generatrices which are at an angle to the direction of the generatrices of the heat-exchange corrugation and which direct the liquid condensate from a bottom end of the heat-exchange corrugation to the outlet box, wherein, in cross section in said general plane, a part of the outlet box which lies between a lowermost point of said outlet box and a lowermost point of intersection of said liquid condensate outlet pipe and said outlet box, is entirely situated at a level that is lower than the level of a lowermost point of the distributor corrugation, and wherein the outlet box is located complete beside the body of the exchanger.

14. Brazed-plates condenser, the condenser comprising a heat exchanger body which has at least one condensation passage for a condensing fluid flowing downward and containing low boiling constituents, said condensation passage being flat in shape and delimited between two substantially vertical parallel plates, said passage having a general plane, said passage containing, over most of its height, a heat-exchange spacer corrugation with substantially vertical generatrices; an inlet box for said fluid, said inlet box being located at the upper end of the passage; an outlet box for a liquid resulting from said condensation of said fluid except said low-boiling constituents, said outlet box being located at the bottom end of the passage and at a bottom end of the plates, said outlet box being connected to a liquid condensate outlet pipe and to a gas outlet pipe; an outlet distributor spacer corrugation having generatrices which are at an angle to the direction of the generatrices of the heat-exchange corrugation and which direct the liquid condensate from a bottom end of the heat-exchange corrugation to the outlet box, wherein, in cross section in said general plane, a part of the outlet box which leis between a lowermost point of said outlet box and a lowermost point of intersection of said liquid condensate outlet pipe and said outlet box, is entirely situated at a level that is lower than the level of a lowermost point of the distributor corrugation, and wherein the outlet box straddles a lower edge of the heat-exchanger body and is connected to this body along an upper longitudinal line running along a lateral face of the body and along a lower longitudinal line running along the underside of said body.

15. Brazed-plates vaporizer-condenser for an air distillation double column, the condenser comprising: a heat exchanger body which has at least one nitrogen condensation passage which is flat in shape and delimited between two substantially vertical parallel plates, said passage having a general plane, said passage containing, over most of its height, a heat-exchange spacer corrugation with substantially vertical generatrices; a nitrogen inlet box for nitrogen to be condensed, said inlet box being located at an upper end of the passage; an liquid nitrogen outlet box for a liquid nitrogen condensate, said outlet box being located at a bottom end of the passage and at a bottom end of the plates, said outlet box being connected to a liquid nitrogen outlet pipe and to a gas outlet pipe; an outlet distributor spacer corrugation having generatrices which are at an angle to the direction of the generatrices of the heat-exchange corrugation and which direct the liquid nitrogen condensate from a bottom end of the heat-exchange corrugation to the outlet box, wherein, in cross section in said general plane, a part of the outlet box which lies between a lowermost point of said outlet box and a lowermost point of intersection of said liquid-outlet pipe and said outlet box, is entirely situated at a level that is lower than the level of a lowermost point of the distributor corrugation.

16. The condenser of claim 2, wherein said inclination is between 10° and 20°.

17. The condenser of claim 1, wherein the heat exchange corrugation has an inclined lowermost line.

18. The condenser of claim 17, wherein said inclined line extends substantially to an uppermost point of the outlet box.

19. An air distillation double column comprising: a medium pressure distillation column; means for feeding said medium pressure column with air to be distilled; a low pressure column; and a vaporizer-condenser condensing nitrogen from the medium pressure column by vaporizing oxygen in the low pressure column, the vaporizer-condenser comprising: a heat exchanger body which has at least one nitrogen condensation passage which is flat in shape and delimited between two substantially vertical parallel plates, said passage having a general plane, said passage containing, over most of its height, a heat-exchange spacer corrugation with substantially vertical generatrices; a nitrogen inlet box for nitrogen to be condensed, said inlet box being located at an upper end of the passage; an liquid nitrogen outlet box for a liquid nitrogen condensate, said outlet box being located at a bottom end of the passage and at a bottom end of the plates, said outlet box being connected to a liquid nitrogen outlet pipe and to a gas outlet pipe; an outlet distributor spacer corrugation having generatrices which are at an angle to the direction of the generatrices of the heat-exchange corrugation and which direct the liquid nitrogen condensate from a bottom end of the heat-exchange corrugation to the outlet box, wherein, in cross section in said general plane, a part of the outlet box which lies between a lowermost point of said outlet box and a lowermost point of intersection of said liquid-outlet pipe and said outlet box, is entirely situated at a level that is lower than the level of a lowermost point of the distributor corrugation; said liquid outlet pipe opening into said medium pressure column; said gas outlet pipe opening outside said double column.

20. An air distillation double column comprising: a medium pressure distillation column; means for feeding said medium pressure column with air to be distilled; a low pressure column; and a vaporizer-condenser condensing nitrogen from the medium pressure column by vaporizing oxygen in the low pressure column, the vaporizer-condenser comprising: a heat exchanger body which has at least one nitrogen condensation passage which is flat in shape and delimited between two substantially vertical parallel plates, said passage having a general plane, said passage containing, over most of its height, a heat-exchange spacer corrugation with substantially vertical generatrices; a nitrogen inlet box for nitrogen to be condensed, said inlet box being located at an upper end of the passage; an liquid nitrogen outlet box for a liquid nitrogen condensate, said outlet box being located at a bottom end of the passage and at a bottom end of the plates, said outlet box being connected to a liquid nitrogen outlet pipe and to a gas outlet pipe; an outlet distributor spacer corrugation having generatrices which are at an angle to the direction of the generatrices of the heat-exchange corrugation and which direct the liquid nitrogen condensate from a bottom end of the heat-exchange corrugation to the outlet box, wherein, in cross section in said general plane, a part of the outlet box which lies between a lowermost point of said outlet box and a lowermost point of intersection of said liquid-outlet pipe and said outlet box, is entirely situated at a level that is lower than the level of a lowermost point of the distributor corrugation; said liquid outlet pipe opening into said medium pressure column; said gas outlet pipe opening outside said double column; wherein the outlet box is located completely beside the body of the exchanger.

21. An air distillation double column comprising: a medium pressure distillation column; means for feeding said medium pressure column with air to be distilled; a low pressure column; and a vaporizer-condenser condensing nitrogen from the medium pressure column by vaporizing oxygen in the low pressure column, the vaporizer-condenser comprising: a heat exchanger body which has at least one nitrogen condensation passage which is flat in shape and delimited between two substantially vertical parallel plates, said passage having a general plane, said passage containing, over most of its height, a heat-exchange spacer corrugation with substantially vertical generatrices; a nitrogen inlet box for nitrogen to be condensed, said inlet box being located at an upper end of the passage; an liquid nitrogen outlet box for a liquid nitrogen condensate, said outlet box being located at a bottom end of the passage and at a bottom end of the plates, said outlet box being connected to a liquid nitrogen outlet pipe and to a gas outlet pipe; an outlet distributor spacer corrugation having generatrices which are at an angle to the direction of the generatrices of the heat-exchange corrugation and which direct the liquid nitrogen condensate from a bottom end of the heat-exchange corrugation to the outlet box, wherein, in cross section in said general plane, a part of the outlet box which lies between a lowermost point of said outlet box and a lowermost point of intersection of said liquid-outlet pipe and said outlet box, is entirely situated at a level that is lower than the level of a lowermost point of the distributor corrugation; said liquid outlet pipe opening into said medium pressure column; said gas outlet pipe opening outside said double column; wherein the outlet box straddles a lower edge of the heat-exchanger body and is connected to this body along an upper longitudinal line running along a lateral face of the body and along a lower longitudinal line running along the underside of said body.

22. In a method of condensing nitrogen in a brazed-plates vaporizer-condenser of an air distillation double column comprising a heat exchanger body which has at least one nitrogen condensation passage which is flat in shape and delimited between two substantially vertical parallel plates, said passage having a general plane, said passage containing, over most of its height, a heat-exchange spacer corrugation with substantially vertical generatrices; a nitrogen inlet box for nitrogen to be condensed, said inlet box being located at an upper end of the passage; an liquid nitrogen outlet box for a liquid nitrogen condensate, said outlet box being located at a bottom end of the passage and at a bottom end of the plates, said outlet box being connected to a liquid nitrogen outlet pipe and to a gas outlet pipe; an outlet distributor spacer corrugation having generatrices which are at an angle to the direction of the generatrices of the heat-exchange corrugation and which direct the liquid nitrogen condensate from a bottom end of the heat-exchange corrugation to the outlet box, wherein, in cross section in said general plane, a part of the outlet box which lies between a lowermost point of said outlet box and a lowermost point of intersection of said liquid-outlet pipe and said outlet box, is entirely situated at a level that is lower than the level of a lowermost point of the distributor corrugation, permanently keeping a free surface of the liquid nitrogen at a level below that of the lowermost point of the distributor corrugation.

23. The condenser of claim 13, wherein the plates are extended downward as far as the lowermost point of the outlet box.

* * * * *